US012782989B2

(12) United States Patent
Giorgio et al.

(10) Patent No.: US 12,782,989 B2
(45) Date of Patent: Nov. 3, 2026

(54) FAST RECOVERY VOLTAGE REGULATOR

(71) Applicant: STMicroelectronics International N.V., Geneva (CH)

(72) Inventors: Michele Giorgio, Milan (IT); Enrico Mammei, Vittuone (IT); Davide Morello, Milan (IT); Matteo Alessio Traldi, Milan (IT); Paolo Pulici, Lainate (IT)

(73) Assignee: STMicroelectronics International N.V., Geneva (CH)

( * ) Notice: Subject to any disclaimer, the term of this patent is extended or adjusted under 35 U.S.C. 154(b) by 24 days.

(21) Appl. No.: 18/773,711

(22) Filed: Jul. 16, 2024

(65) Prior Publication Data

US 2026/0023403 A1 Jan. 22, 2026

(51) Int. Cl.
*G05F 1/565* (2006.01)
*G05F 1/575* (2006.01)

(52) U.S. Cl.
CPC .............. *G05F 1/565* (2013.01); *G05F 1/575* (2013.01)

(58) Field of Classification Search
CPC ................................. G05F 1/565; G05F 1/575
See application file for complete search history.

(56) References Cited

U.S. PATENT DOCUMENTS

| | | | | |
|---|---|---|---|---|
| 5,867,015 | A * | 2/1999 | Corsi | G05F 3/242 327/542 |
| 7,990,219 | B2 | 8/2011 | Gleason et al. | |
| 8,169,203 | B1 * | 5/2012 | Vemula | G05F 1/575 323/273 |
| 9,229,462 | B2 * | 1/2016 | Shukla | G05F 1/468 |
| 10,496,118 | B2 * | 12/2019 | Sakaguchi | G05F 1/575 |
| 11,720,128 | B2 * | 8/2023 | Mammei | G05F 1/565 360/55 |
| 11,886,215 | B2 * | 1/2024 | Fiocchi | G05F 1/575 |
| 2003/0067700 | A1 | 4/2003 | Barnett | |
| 2007/0241730 | A1 * | 10/2007 | Dow | G05F 1/575 323/280 |
| 2008/0174289 | A1 | 7/2008 | Gurcan | |
| 2010/0090667 | A1 | 4/2010 | Gleason | |
| 2013/0028355 | A1 * | 1/2013 | Khayrallah | H04L 27/3416 375/340 |
| 2015/0301540 | A1 * | 10/2015 | Shukla | G05F 1/56 327/540 |

(Continued)

*Primary Examiner* — Thienvu V Tran
*Assistant Examiner* — Yahveh Comas Torres
(74) *Attorney, Agent, or Firm* — Slater Matsil, LLP

(57) ABSTRACT

According to an embodiment, a linear voltage regulator is proposed. The regulator includes a voltage source circuit that provides a first voltage at its output terminal. An output transistor having a control terminal is coupled to the output terminal of the voltage source circuit to receive the first voltage. A first current path terminal of the output transistor is couplable to a load and provides a regulated output voltage to the load based on the first voltage. A feedback loop circuit includes sense circuitry to sense current sourced by the output transistor. The circuitry is coupled to a second current path terminal of the output transistor, and a second transistor is configured as a current mirror with the sense circuitry. The second transistor is coupled to the load, wherein the current mirror has a ratio of 1:M, where M is a number normally greater than or equal to 1.

20 Claims, 10 Drawing Sheets

(56) References Cited

U.S. PATENT DOCUMENTS

| | | | | |
|---|---|---|---|---|
| 2016/0028355 | A1* | 1/2016 | Herrera | H03F 3/3069 330/257 |
| 2018/0188756 | A1* | 7/2018 | Siao | G05F 1/461 |
| 2020/0050225 | A1* | 2/2020 | Fiocchi | G05F 1/575 |
| 2020/0293075 | A1* | 9/2020 | Enam | G05F 1/575 |
| 2021/0067152 | A1 | 3/2021 | Nuttgens | |
| 2022/0171417 | A1* | 6/2022 | Fiocchi | G05F 1/575 |
| 2022/0197321 | A1 | 6/2022 | Tiagaraj | |
| 2022/0350356 | A1* | 11/2022 | D'Souza | H02M 3/156 |
| 2022/0382307 | A1* | 12/2022 | Tse | G05F 1/565 |
| 2022/0413531 | A1* | 12/2022 | Mammei | G05F 1/565 |

* cited by examiner

PRIOR ART

FAST RECOVERY VOLTAGE REGULATOR

TECHNICAL FIELD

The present disclosure generally relates to electronic devices and, in particular embodiments, to a split output voltage regulator.

BACKGROUND

Voltage regulators are electrical circuits configured to provide a stable DC voltage at their output. For example, FIG. 1 shows an exemplary voltage regulator 100. As shown in FIG. 1, the operational amplifier (op-amp) 104 controls the transistor 102 based on the reference voltage ($V_{REF}$) and the feedback voltage ($V_{FB}$) to maintain the output voltage ($V_{OUT}$) at a target voltage.

For example, during normal operation, an error signal $V_{102}$, based on feedback voltage ($V_{FB}$) and reference voltage ($V_{REF}$), controls the gate of transistor 102 to maintain the output voltage ($V_{OUT}$) at the target voltage, based on the reference voltage ($V_{REF}$).

During a load transient event (e.g., a sudden change in load current ($I_{LOAD}$)), output voltage ($V_{OUT}$) may temporarily overshoot or undershoot with respect to the target voltage. For example, when the load current ($I_{LOAD}$) suddenly increases, the output voltage ($V_{OUT}$) may suddenly decrease, which may also cause the feedback voltage ($V_{FB}$) to decrease. Op-amp 104 may cause an increase in voltage $V_{102}$ and thus cause the output voltage ($V_{OUT}$) to recover to the target voltage. Since the response time of op-amp 104 may be slower than the period in which the sudden drop in output voltage ($V_{OUT}$) occurs, a voltage undershoot of, for example, several mV may occur. The duration and magnitude of the output voltage drop may be related to the response time of the feedback loop, which includes feedback network 106, op-amp 104, and transistor 102.

SUMMARY

Technical advantages are generally achieved by embodiments of this disclosure, which describe a split output voltage regulator with fast recovery loop.

A first aspect relates to a linear voltage regulator, comprising a voltage source circuit configured to provide a first voltage at an output terminal of the voltage source circuit; an output transistor having a control terminal coupled to the output terminal of the voltage source circuit and configured to receive the first voltage, a first current path terminal of the output transistor couplable to a load and configured to provide a regulated output voltage to the load based on the first voltage; and a feedback loop circuit comprising: sense circuitry configured to sense current sourced by the output transistor, the circuitry coupled to a second current path terminal of the output transistor, and a second transistor configured as a current mirror with the sense circuitry, the second transistor coupled to the load, wherein the current mirror has a ratio of 1:M, where M is a number normally greater than or equal to 1.

A second aspect relates to a linear voltage regulator, comprising: a voltage source circuit configured to provide a first voltage at an output terminal of the voltage source circuit; a plurality of output transistors, each output transistor having a control terminal coupled to the output terminal of the voltage source circuit and configured to receive the first voltage, a first current path terminal of each output transistor configured to provide a respective regulated output voltage based on the first voltage to a respective stage of a complimentary metal-oxide-semiconductor (CMOS) logic chain, wherein the CMOS logic chain comprises a plurality of consecutive CMOS logic stages; and a plurality of feedback loop circuits, each feedback loop circuit comprising: a feedback transistor configured in a transdiode configuration and coupled to a second current path terminal of an associated output transistor, and a second transistor configured as a current mirror with the feedback transistor, the second transistor couplable to the respective stage of the CMOS logic chain coupled with the associated output transistor, wherein the current mirror has a ratio of 1:M, where M is an integer greater than or equal to 1.

A third aspect relates to a write circuit for writing data to a hard disk drive, the write circuit comprising: an output digital-to-analog converter (DAC); a complimentary metal-oxide-semiconductor (CMOS) logic chain configured to drive the DAC, the CMOS logic chain comprising a plurality of consecutive CMOS logic sets; a linear voltage regulator, comprising: a voltage source circuit configured to provide a first voltage at an output terminal of the voltage source circuit; a plurality of output transistors, each output transistor having a control terminal coupled to the output terminal of the voltage source circuit and configured to receive the first voltage, a first current path terminal of each output transistor configured to provide a respective regulated output voltage based on the first voltage to a respective stage of the plurality of consecutive CMOS logic sets; and a plurality of feedback loop circuits, each feedback loop circuit comprising: a feedback transistor configured in a transdiode configuration and coupled to a second current path terminal of an associated output transistor, and a second transistor configured as a current mirror with the feedback transistor, the second transistor couplable to the respective stage of the CMOS logic chain coupled with the associated output transistor.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
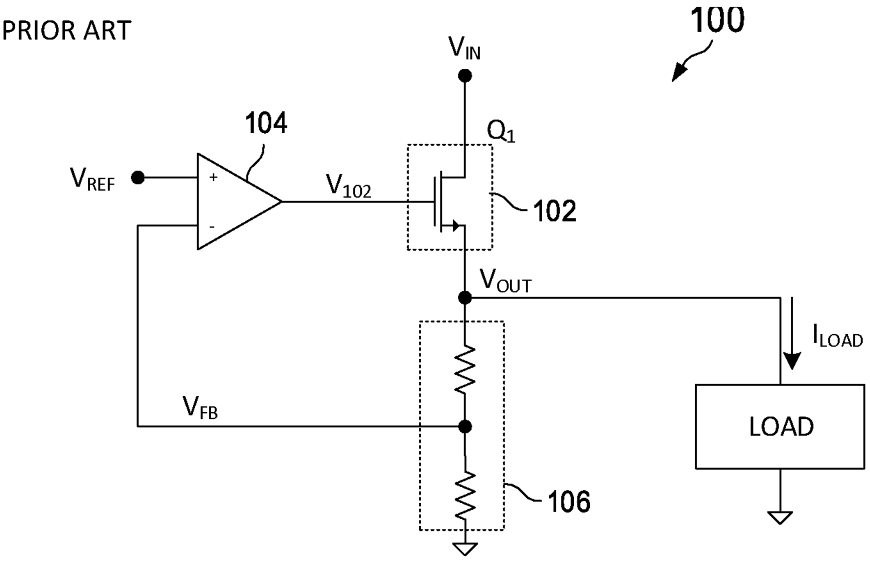
FIG. 1 is an exemplary voltage regulator.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a voltage regulator using bipolar transistors with fast transient response used in, for example, hard disk drive applications, it should also be appreciated that these inventive aspects may also apply to other transistor types, such as metal-oxide-semiconductor field-effect transistors (MOSFETs). In particular, aspects of this disclosure may similarly apply to other applications, such as power management units (PMU) on portable devices and low-power high-frequency CMOS circuits, as well as in other applications that may benefit from a stable regulated voltage.

Aspects of the disclosure provide a linear voltage regulator with a fast feedback loop circuit and a divided output stage. The CMOS logic chains that drive the output digital-to-analog converter of a write circuit H-bridge can be divided into consecutive sets. Each set can be provided a corresponding supply voltage from the divided output stage of the linear voltage regulator. The proposed linear voltage regulator provides a substantial decrease in jitter-achieving a 69% improvement compared to the performance of state-of-the-art regulators. Notably, these enhancements are attained without increasing the total power consumption or expanding the area occupied by the regulator.

In embodiments, a linear voltage regulator with an open-loop feedback architecture that advantageously achieves fast turn-on time (e.g., few ns and less than 25 ns) and provides a stable output voltage to a load is proposed. In embodiments, the linear voltage regulator includes a feedback loop circuit (e.g., inserting a fast NPN feedback loop) on multiple branches to drive different load portions and quickly recover the regulated output voltage to the original value. The NPN feedback loop reduces the current coming from the output PNP element, reducing the base-to-emitter voltage ($V_{BE}$) variation caused by current load variation, and overcomes the technological limitations of worse performance of PNP bipolar transistors. In embodiments, the output stage of the linear voltage regulator can be split into multiple stages. These and additional details are further detailed below.

Figure 2A:
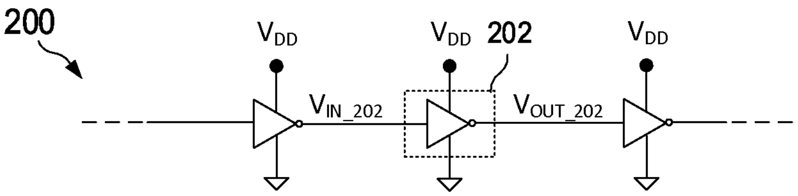
FIGS. 2A-B are exemplary inverter chains and associated waveforms.
Figure 2B:
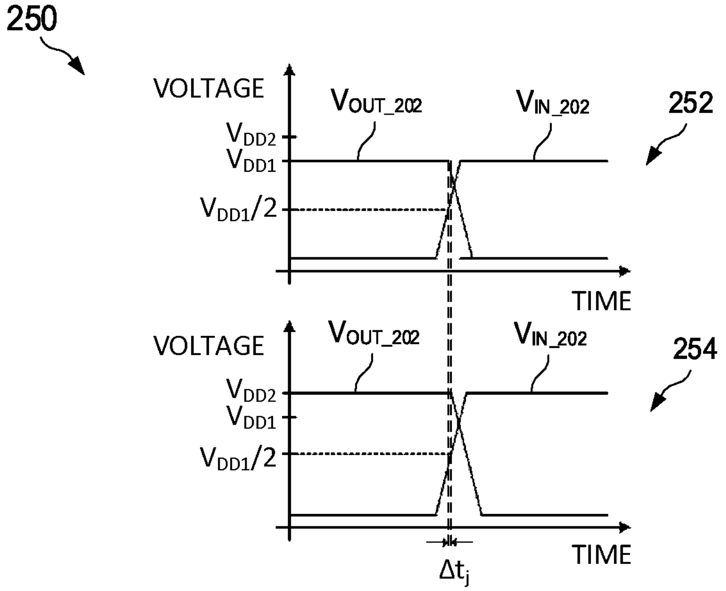

FIGS. 2A-B illustrate an exemplary inverter chain 200 and associated waveforms 250, respectively, at different supply voltages. As illustrated by plots 252 and 254, the threshold voltage at which inverter 202 changes state is based on the value of supply voltage ($V_{DD}$). When the supply voltage ($V_{DD}$) has a lower voltage ($V_{DD1}$), the threshold value of inverter 202 is lower than when the supply voltage ($V_{DD}$) has a higher voltage ($V_{DD2}$). However, this relationship between supply voltage ($V_{DD}$) and the threshold voltage is not the primary factor determining transition times.

While the shift in threshold voltage of inverter 202 does affect transition the transition time, as illustrated by $\Delta t_j$, the dominant mechanism is different. A lower supply voltage ($V_{DD}$) corresponds to a higher overall propagation delay. This is because a lower power supply causes the transistors in the logic gate to operate with reduced gate-to-source voltage (VGS), resulting in higher on-resistance (RON). The output node voltage changes with a time constant of RON× COUT, where COUT is the total capacitance at the output node. Thus, higher RON leads to longer transition times. Variations in supply voltage ($V_{DD}$) still cause timing jitter, which is a deviation from the expected switching times of a signal, but through this more complex mechanism involving transistor operation rather than solely through threshold voltage shifts.

Some applications can be sensitive to jitter. For example, in some hard disk drive (HDD) applications, a write circuit provides a high-speed current signal to a magnetic head, creating a magnetic field powerful enough to encode bits of information onto a disk.

The disk is designed for longevity and efficiency. It supports numerous read and write operations, with transitions between reading and writing occurring rapidly-on the scale of nanoseconds. Further, each bit inscribed onto the disk is marked with a short duration of approximately 0.2 nanoseconds. The bit error rate (BER), influenced by the jitter in the high-speed current signal, affects the system's efficacy. The bit error rate of the hard disk drive can be minimized by reducing the jitter in the high-speed current signal provided by the write circuit.

Figure 3:
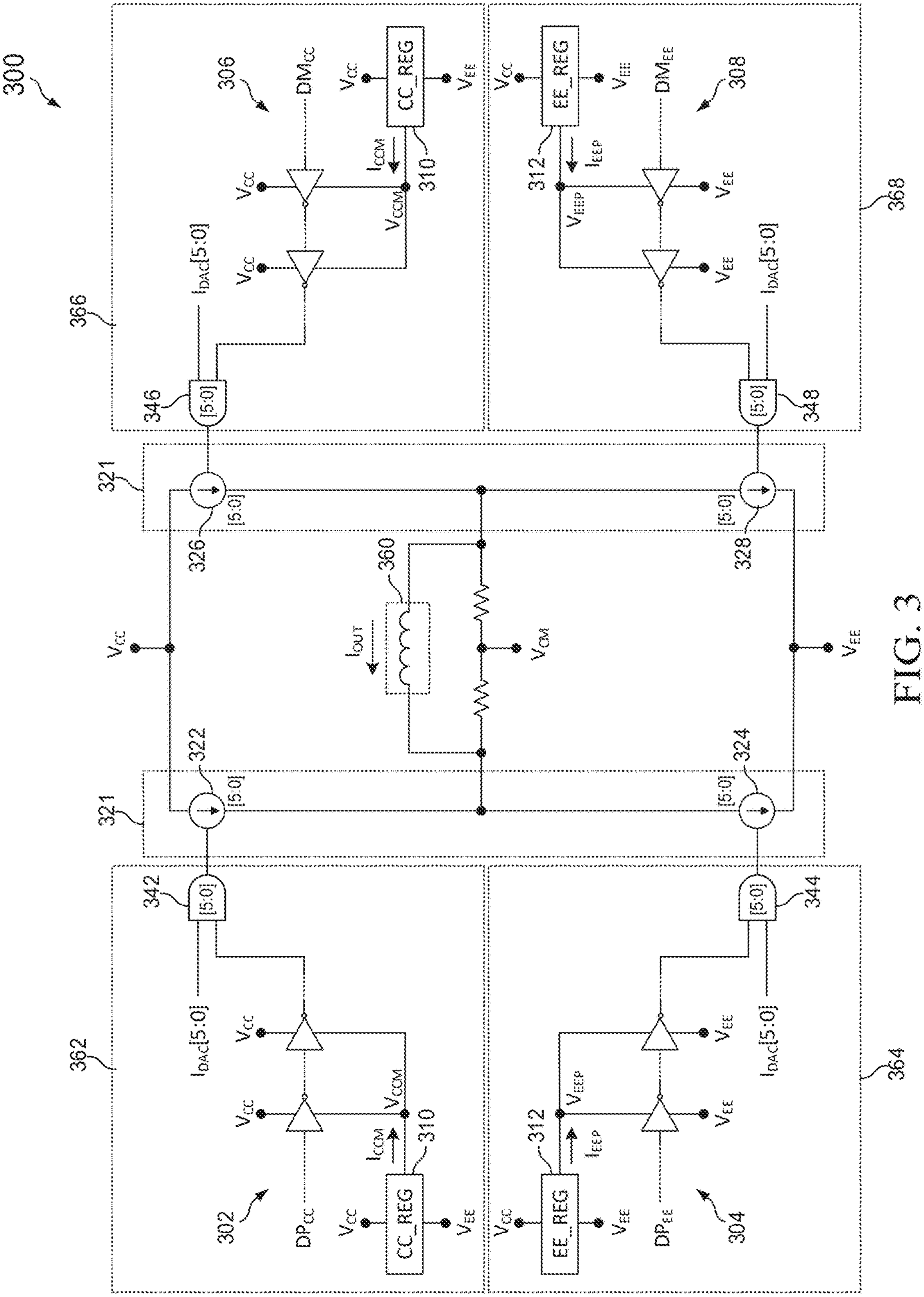
FIG. 3 is a simplified schematic of a write circuit output stage used in a hard disk drive application.

FIG. 3 illustrates a simplified schematic of a write circuit 300 output stage used in a hard disk drive application. Write circuit 300 includes four digital-to-analog converters (DACs) arranged in an H-bridge configuration. Each DAC receives differential data ($DP_{CC}$, $DM_{CC}$, $DP_{EE}$, and $DM_{EE}$) via logic chains (302, 304, 306, 308). The output current ($I_{OUT}$) is generated based on the received differential data and with a magnitude based on a DAC code ($I_{DAC}$) provided to the input of the AND gates 342, 344, 346, and 348.

Specifically, the output current ($I_{OUT}$) is provided through output stage 321 to load 360 (e.g., a magnetic head for writing a disk). The direction of the output current ($I_{OUT}$) at the load 360 is determined by enabling branches in the H-bridge configuration. For example, if the bottom left branch (364) and the top right branch (366) are enabled, the current flows from the right to the left (i.e., as shown in FIG. 3). In contrast, if the top left branch (362) and the bottom right branch (368) are enabled, the current flows from the left to the right (i.e., opposite of the direction shown in FIG. 3). Accordingly, the DACs within each branch are enabled and disabled at a high frequency to generate an output current ($I_{OUT}$) for writing data on the hard disk drive.

Logic chains 302, 304, 306, and 308 include a plurality (e.g., 30 plus components) of (e.g., scaled CMOS devices) logic gates (e.g., AND gate(s), OR gate(s), NAND gate(s), NOR gate(s), XOR gate(s), XNOR gate(s), inverter(s), and/or buffer(s)) connected in a chain. The logic chains 302 and 306 act as a driving stage to drive the output DAC at each branch of the H-bridge.

High-side linear voltage regulator (CC_REG) 310 provides supply voltage $V_{CCM}$ to the logic gates of logic chains 302 and 306. The low-side linear voltage regulator (EE_REG) 312 provides supply voltage $V_{EEP}$ to the logic gates of logic chains 304 and 308. In embodiments, as the logic chains (302, 304, 306, 308) switch, the high-side linear voltage regulator (CC_REG) 310 and the low-side linear voltage regulator (EE_REG) 312 may each provide over 100 mA of current or more (e.g., 150 mA or more) to the logic gates of the logic chains (302, 304, 306, 308).

In some embodiments, the data transfer data rate may be 4 Gbps, but other data are also possible. Accordingly, the logic gates are configured to switch at high data rates, such as 4 Gbps.

DAC code ($I_{DAC}$) includes 6 bits. Thus, as shown, there are 6 AND gates 342 driving 6 respective current sources 322, 6 AND gates 344 driving 6 respective current sources 324, 6 AND gates 346 driving 6 respective current sources 326, and 6 AND gates 348 driving 6 respective current sources 328. In some embodiments, DAC code ($I_{DAC}$) may include more than 6 bits, such as 7 bits, 8 bits, or more, or less than 6 bits, such as 5 bits or less.

In embodiments, the supply voltage $V_{CC}$ may be, for example, 5V. Accordingly, the high-side linear voltage regulator (CC_REG) 310 is configured to generate the voltage $V_{CCM}$, which is lower than the supply voltage $V_{CC}$. In embodiments, 1V, 0.8V, 1.2V, or other voltages can be suitable for the application.

In embodiments, the supply voltage $V_{EE}$ may be, for example, −3V. Accordingly, the low-side linear voltage regulator (EE_REG) 312 is configured to generate the voltage $V_{EEP}$, which is higher than the supply voltage $V_{EE}$. In embodiments, 1V, 0.8V, 1.2V, or other voltages can be suitable for the application. In embodiments, for example, $V_{CC}$ can be 5V, $V_{CCM}$ can be 4V, $V_{EE}$ can be −3V, and $V_{EEP}$ can be −2V. Other voltages are also possible in embodiments.

The stability of the regulated voltage can be crucial, as any fluctuation in this voltage can lead to alterations in the propagation delay within the logic chain. Such variations in the regulated voltage can delay or anticipate the moment at which the output DACs of the H-Bridge are turned ON and OFF with respect to the case of nominal regulated voltage. Consequently, regulated voltage variations can result in slight discrepancies in the zero crossing of the output current ($I_{OUT}$). These discrepancies directly influence the output jitter, the variance between the current's highest and lowest delayed transitions. The dependence of the jitter from the power supply (i.e., the regulated voltage) is, by definition, a Power Supply Induced Jitter (PSIJ), one of the main sources of jitter in this specific application.

Figure 4:
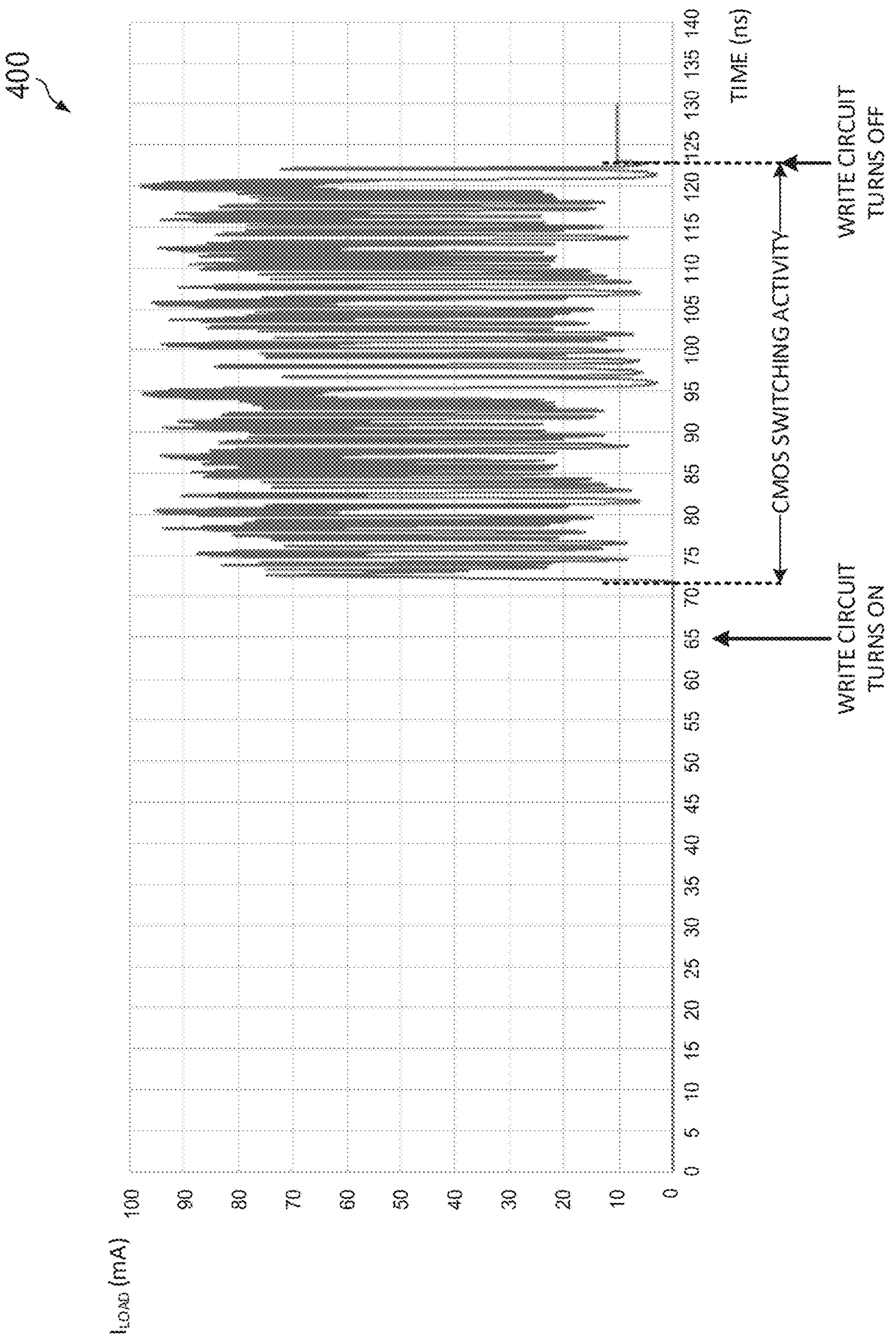
FIG. 4 is a possible output current of the low-side linear voltage regulator.

FIG. 4 shows a possible output current of the low-side linear voltage regulator (EE_REG) 312. The high-side linear voltage regulator (CC_REG) 310 may exhibit an output current similar to the one shown in FIG. 4. Its absolute value can be large due to the different sizes of the power elements on the high and low sides.

As shown, shortly after write circuit 300 is activated (e.g., less than 25 ns after write circuit 300 is activated), the current provided by the low-side linear voltage regulator (EE_REG) 312 exhibits a relatively large and continuous output current fluctuation with a variation of about 90-100 mA (or more) for, for example, 50 ns. The period during which the write circuit is active may vary and may be longer than 50 ns, such as 60 ns, 100 ns, or longer, or shorter than 50 ns, such as 40 ns, or shorter. In embodiments, the current fluctuation exhibited by the output current of the low-side linear voltage regulator (EE_REG) 312 may be bigger (e.g., 100 mA, 150 mA, or more) or smaller (e.g., 80 mA or less).

The rapid data transfer speeds required in hard disk drive applications lead to a reduced time frame for stabilizing the output voltage. Additionally, the series of logic components responsible for managing the flow of digital information to the digital-to-analog converter introduces further delays due to signal propagation times. On top of this, the inherent technological constraints associated with the performance of PNP bipolar transistors present challenges in maintaining precise control and regulation of the output voltage.

A signal is generated to transition between the reader and the writer phases. For example, a signal is issued when the decision is made to switch to write mode. Following this signal, the system supplies the necessary output current within a brief period, for example, within 5 to 10 nanoseconds. To facilitate this rapid response, voltage regulators must be capable of establishing a stable voltage in an even shorter time frame. Achieving this swift voltage stabilization can be essential to providing a consistent output current from the outset, which can be a key factor in minimizing the power supply-induced jitter (PSIJ). Consequently, it is advantageous for the regulators to have a fast turn-on time.

The ideal scenario would stipulate that all data transitions align perfectly at the same moment when the time transient behavior is analyzed, leading to a precise temporal discretization. In such a case, even when the beat patterns change and the data signal is folded back, the signals are to be superimposed. However, observations have indicated that due to power supply drops, fluctuations occur over time in these transitions, creating errors in the data transitions written to the magnetic disk.

Timing jitter of the output current can have several causes, with variations in power supply being a significant contributor. The fluctuations of the regulated voltage are due to the current requested by the load (i.e., the logic chain) every time a transition occurs. Therefore, the fluctuation depends on the data patterns being written to the disk: writing a pattern such as '1010' and then '0101' requires substantial load changes, potentially necessitating the switching of higher currents through the entire CMOS chain due to multiple transitions. Conversely, the required current for switching would be less for a pattern like '1111' and then '1110' with fewer transitions. The variations in current demand based on different data patterns imply that the power supply or internal regulator must account for and adapt to these diverse load conditions to maintain the precision of data transitions and minimize jitter.

For example, as the input signal is a clock with numerous transitions, the resulting high frequency of changes induces significant load and current demand, leading to a drop in the voltage supplied by the internal regulator. This scenario represents a worst-case condition for propagation delay as the internal regulator has the shortest time to recover to the steady state condition. In contrast, the best case scenario for a propagation delay is when the input pattern is a single pulse, where no transition occurs for a duration needed by the regulator to recover to the steady state condition. Under these circumstances, the load on the internal regulator is minimal, requiring only enough current to facilitate that solitary transition.

Actual data patterns transmitted can encompass any range between these extreme conditions, from a single pulse to a clock operating at its maximum frequency, causing abrupt shifts in the load experienced by the internal regulator. The pattern being propagated directly influences this load variation.

It is advantageous for the response time to remain consistent regardless of load demand to ensure optimal performance across the full spectrum of possible load conditions. This consistency guarantees that the power supply can handle minimal and maximal load requirements without compromising performance.

An existing approach incorporates slow and fast feedback loops in a closed-loop architecture. The slow loop maintains a controlled and regulated voltage over time, while the fast loop responds to rapid changes in the load current. However, this approach has limitations related to slow switch-on times (i.e., low bandwidth), as the slow loop can take considerable time to activate.

An alternative approach relies on an open-loop architecture. This architecture includes a fast feedback loop circuit that responds to quick output current fluctuations ($I_{OUT}$). However, particularly in the case of the high-side linear voltage regulator (CC_REG) 310, the approach has the drawback of noticeable jitter attributed to the relatively inferior performance characteristics of the PNP BJTs compared to the NPN BJTs. Consequently, when there is a substantial variation in the load current, the change in base-emitter voltage ($\Delta V_{BE}$), and therefore the regulated output voltage remains high, leading to jitter degradation at the output of the logic chain, adversely affecting the overall system performance.

Figure 5:
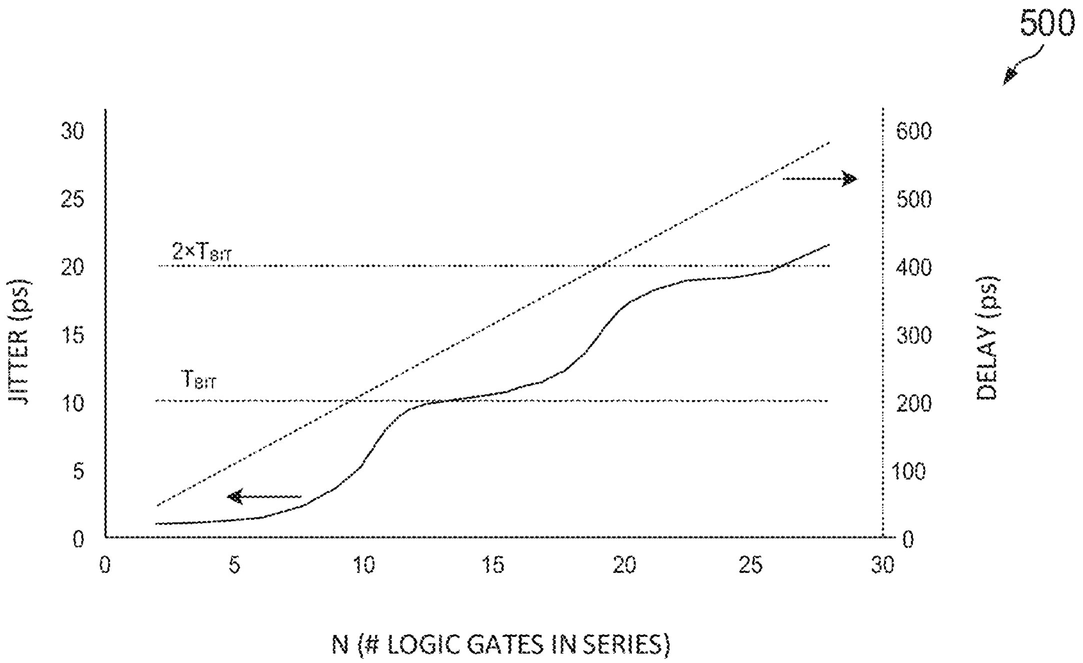
FIG. 5 is a correlation between propagation delay and output jitter in the logic chain.

In FIG. 5, plot 500 illustrates the correlation between propagation delay and output jitter in the logic chain, with the number of serially connected logic gates depicted along the x-axis. In FIG. 5, the fan-out is greater than one. Fan-out (i.e., electrical effort) is the ratio between the external (load) capacitance and the gate (input) capacitance of the stage or logic chain. The driven load increases from the initial stage to the final stage, which in turn drives the DAC gates.

A direct relationship exists between delay and the count of logic gates; as the chain accumulates more gates, delay increases accordingly. Plot 500 illustrates a substantial rise in jitter when the logic chain's total delay approaches the duration of a bit-time (i.e., the half-period of the input data to be written on the hard disk drive if the input is a clocked signal).

Disturbances in the regulated output voltage are typically resolved only after all logic gates have completed their switching processes. However, if a new bit is introduced before the chain has fully transitioned, the regulated voltage will still be perturbed with respect to its steady state, leading to jitter in the output current induced by the power supply.

The latter segments of the logic chain are heavily loaded because they directly drive the DAC. Consequently, once the logic chain's delay extends to one-bit time (i.e., 1 $T_{bit}$), it signifies that the incoming data transition occurs in conjunction with the fading impact of the preceding transition; the remnants of the prior transition's influence are still detectable. This issue also arises when the delay lengthens to twice the bit-time (i.e., 2 $T_{bit}$), indicating that the effect of the antecedent transition lingers and echoes from the initial transition remain present. Accordingly, the jitter level escalates when the logic chain's delay surpasses multiples of the bit time ($T_{BIT}$). These residual influences from previous bits perturb the regulated voltage levels, which, in turn, escalates jitter within the logic chain.

This increase in jitter is also noticeable when the propagation delay remains unchanged while the bit-time decreases, corresponding to higher input signal data rates. Thus, faster data rates decrease the bit-time, exacerbating the jitter and further influencing the timing precision required for data writing processes.

Figure 6:
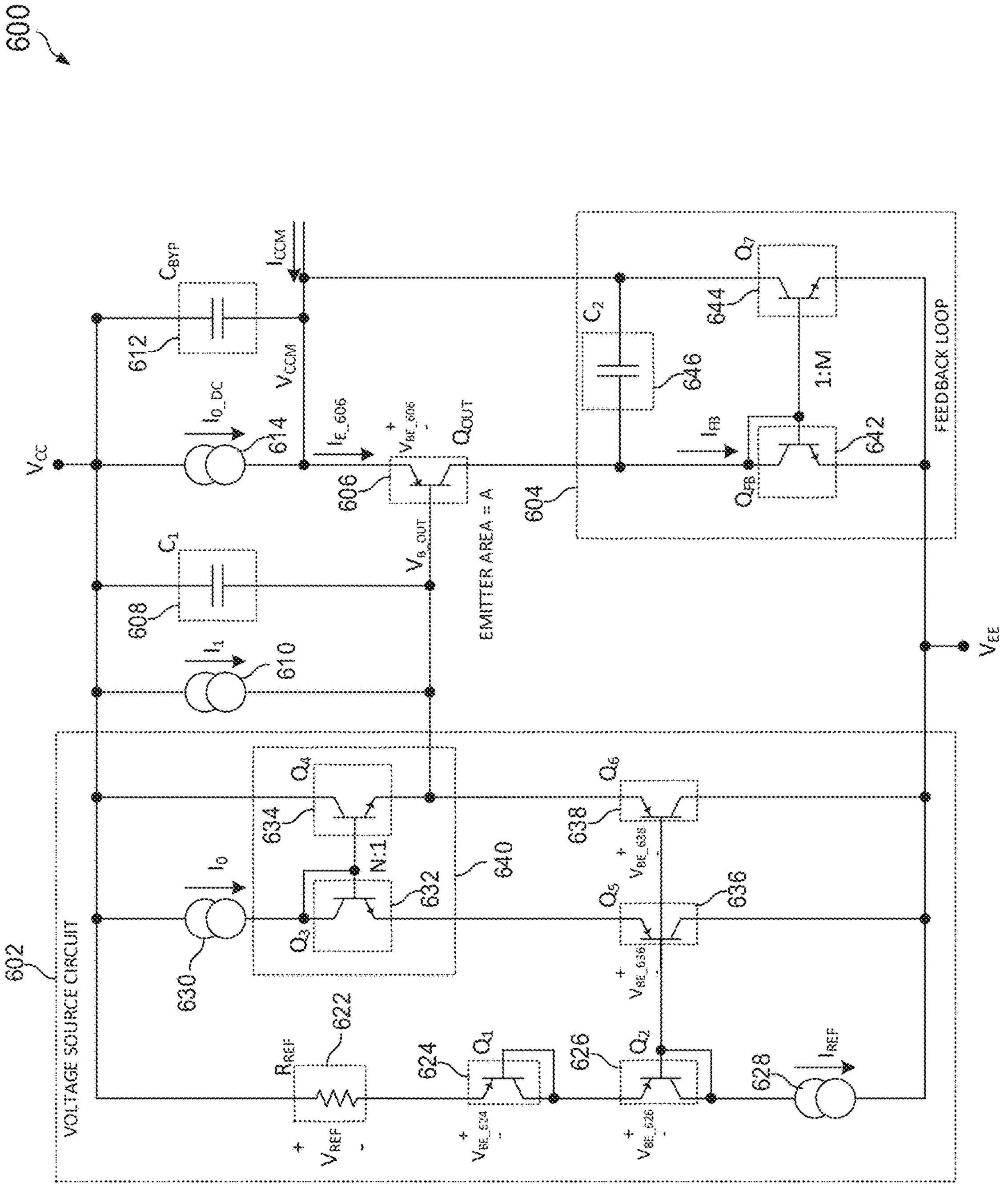
FIG. 6 is a schematic of an embodiment linear voltage regulator.

FIG. 6 illustrates a schematic of an embodiment linear voltage regulator 600, which may be implemented as the high-side linear voltage regulator (CC_REG) 310 of write circuit 300 and configured to generate the regulated output voltage ($V_{CCM}$), which is a more negative voltage the supply voltage ($V_{CC}$).

Linear voltage regulator 600 includes a voltage source circuit 602, a feedback loop circuit 604, an output transistor ($Q_{OUT}$) 606, a first capacitor (C1) 608, a first current generator 610, a bypass capacitor ($C_{BYP}$) 612, and a second current generator 614, which may (or may not) be arranged as shown. Linear voltage regulator 600 may include additional components not shown.

Voltage source circuit 602 is configured to generate an output voltage ($V_{B\_OUT}$) to the base of the output transistor ($Q_{OUT}$) 606. In embodiments, the output transistor ($Q_{OUT}$) 606 is implemented as a PNP bipolar junction transistor (BJT) in a voltage follower configuration with a biasing current ($I_{o\_DC}$). The biasing current ($I_{o\_DC}$) is generated by the second current generator 614 coupled to the emitter terminal of the output transistor ($Q_{OUT}$) 606. Thus, the regulated output voltage ($V_{CCM}$), during steady state is given by:

$$V_{CCM} = V_{B\_OUT} + |V_{BE\_606}| \quad (1)$$

where the voltage $V_{BE\_606}$ represents the base-to-emitter voltage of the output transistor ($Q_{OUT}$) 606. In embodiments, the regulated output voltage ($V_{CCM}$) is between 1 and 5V. In embodiments, the regulated output voltage ($V_{CCM}$) can be 4V.

Voltage source circuit 602 includes a reference resistor ($R_{REF}$) 622, a first transistor ($Q_1$) 624, a second transistor ($Q_2$) 626, a reference current generator 628, a third current generator 630, a third transistor ($Q_3$) 632, a fourth transistor ($Q_4$) 634, a fifth transistor ($Q_5$) 636, and a sixth transistor ($Q_6$) 638, which may (or may not) be arranged as shown. Voltage source circuit 602 may include additional components not shown.

In embodiments, the reference voltage ($V_{REF}$) can be generated without the reference resistor ($R_{REF}$) 622 and relying on a dedicated circuit correlated to the CMOS performance. The reference voltage ($V_{REF}$) tracks the CMOS performance and, thus, its technology corner.

The first transistor ($Q_1$) 624 and the second transistor ($Q_2$) 626 are PNP BJTs arranged in a diode-connected configuration. The third transistor ($Q_3$) 632 and the fourth transistor ($Q_4$) 634 are NPN BJTs arranged as a first current mirror 640 with a ratio of N:1, where N is a positive integer. In embodiments, N is a value between 1 and 50. In an embodiment, N equals 10. The fifth transistor ($Q_5$) 636 and the sixth transistor ($Q_6$) 638 are PNP BJTs.

The fourth transistor ($Q_4$) 634 and the sixth transistor ($Q_6$) 638 are arranged in a push-pull configuration with their emitters insisting on the output voltage ($V_{B\_OUT}$) node. Upon transition, the transistors are responsible for injecting or absorbing the base current of the output transistor ($Q_{OUT}$) 606, providing a low impedance path to the power supplies and, therefore, limiting the excursion at the output voltage ($V_{B\_OUT}$) node. The current generator 630, the third transistor ($Q_3$) 632, and the fifth transistor ($Q_5$) 636 provide the bias for the push-pull configuration.

During normal operation, the reference current ($I_{REF}$) generated by the reference current generator 628 flows through the reference resistor ($R_{REF}$) 622, thereby generating the reference voltage ($V_{REF}$) across the reference resistor ($R_{REF}$) 622. Accordingly, during the steady state (i.e., nominally), the output voltage ($V_{B\_OUT}$) generated by the voltage source circuit 602 follows the equation:

$$V_{B\_OUT} = V_{CC} - V_{REF} + |V_{BE\_624}| + |V_{BE\_626}| - |V_{BE\_638}| \quad (2)$$

where the voltage $V_{BE\_624}$ represents the base-to-emitter voltage of the first transistor ($Q_1$) 624, the voltage $V_{BE\_626}$ represents the base-to-emitter voltage of the second transistor ($Q_2$) 626, and the voltage $V_{BE\_638}$ represents the base-to-emitter voltage of the sixth transistor ($Q_6$) 638.

In embodiments, the base-to-emitter voltage ($V_{BE\_624}$) of the first transistor ($Q_1$) 624 and the base-to-emitter voltage ($V_{BE\_626}$) of the second transistor ($Q_2$) 626 equals the base-to-emitter voltage ($V_{BE\_638}$) of the sixth transistor ($Q_6$) 638. In such embodiments, the output voltage ($V_{B\_OUT}$) follows the equation:

$$V_{B\_OUT} = V_{CC} - V_{REF} - |V_{BE\_624}| \tag{3}$$

where the output voltage ($V_{B\_OUT}$) is one base-to-emitter voltage ($V_{BE}$) lower than difference between the supply voltage ($V_{CC}$) and the reference voltage ($V_{REF}$).

In embodiments, during the steady state, the regulated output voltage ($V_{CCM}$) of the linear voltage regulator 600 follows the equation:

$$V_{CCM} = V_{CC} - V_{REF} - |V_{BE\_624}| - |V_{BE\_626}| + |V_{BE\_638}| + |V_{BE\_606}| \tag{4}$$

where the voltage $V_{BE\_606}$ represents the base-to-emitter voltage of the output transistor ($Q_{OUT}$) 606.

In embodiments, the sum of the base-to-emitter voltage of the first transistor ($Q_1$) 624 and the base-to-emitter voltage of the second transistor ($Q_2$) 626 (i.e., $V_{BE\_624}+V_{BE\_626}$) equals the sum of the base-to-emitter voltage of the sixth transistor ($Q_6$) 638 and the base-to-emitter voltage of the output transistor ($Q_{OUT}$) 606 (i.e., $V_{BE\_638}+V_{BE\_606}$). In such embodiments, the regulated output voltage ($V_{CCM}$) of the linear voltage regulator 600 equals the difference between the supply voltage ($V_{CC}$) and the reference voltage ($V_{CC}-V_{REF}$).

Feedback loop circuit 604 is configured to quickly recover the regulated output voltage ($V_{B\_OUT}$) to its original value. Feedback loop circuit 604 includes a feedback transistor ($Q_{FB}$) 642, a seventh transistor ($Q_7$) 644, and an optional second capacitor ($C_2$) 646, which may (or may not) be arranged as shown. Feedback loop circuit 604 may include additional components not shown.

The feedback transistor ($Q_{FB}$) 642 and the seventh transistor ($Q_7$) 644 are NPN BJTs. The NPN BJTs of the feedback loop circuit 604 advantageously allow the linear voltage regulator 600 to minimize base-to-emitter voltage ($V_{BE}$) variations coming from the current load transient variation and to overcome the possible technological limitations of the relatively poor performance of PNP bipolar transistors used in conventional solutions.

The collector and base terminals of the feedback transistor ($Q_{FB}$) 642 are coupled to the collector terminal of the output transistor ($Q_{OUT}$) 606. The collector terminal of the seventh transistor ($Q_7$) 644 is coupled to the emitter terminal of the output transistor ($Q_{OUT}$) 606 at the output node of the linear voltage regulator 600.

Feedback loop circuit 604 is configured as a current mirror with the mirroring factor M (ratio of 1:M), where M is a positive integer. Increasing the value of M can be beneficial up to a point; however, exceedingly high values complicate the stabilization process of the feedback loop circuit 604. A correspondingly second capacitor ($C_2$) 646 can become necessary to counterbalance stability issues at higher values of M. The second capacitor ($C_2$) 646 narrows the bandwidth, reducing the capacity to promptly respond to changes in the load. In embodiments, M is a value between 1 and 10. In an embodiment, M equals 4. This capacitor can be avoided in case the loop is intrinsically stable.

In response to a sudden increase of the output current ($I_{CCM}$) (i.e., surge in current) due to a load transient event, the excess current flows partially through the bypass capacitor ($C_{BYP}$) 612 and partially through the output transistor ($Q_{OUT}$) 606. The additional current flow through the output transistor ($Q_{OUT}$) 606 is replicated (i.e., mirrored) by the feedback loop circuit 604 by a factor M. Accordingly, based on the loop gain M, the feedback loop circuit 604 carries a portion of the output current ($I_{CCM}$) during the current surge.

After an adjustment period to stabilize the feedback loop circuit 604, the current distribution arrangement reduces the current load at the output transistor ($Q_{OUT}$) 606 by drawing excess current at the output transistor ($Q_{OUT}$) 606. This mechanism mitigates the variation of the base-to-emitter voltage ($\Delta V_{BE\_OUT}$) of the output transistor ($Q_{OUT}$) 606 and the regulated voltage fluctuation that would typically result from such a sudden influx of current at the output transistor ($Q_{OUT}$) 606.

Accordingly, the feedback loop circuit 604 addresses the fluctuations in the output current ($I_{CCM}$), which can be minor in certain instances and then abruptly shift to higher levels due to changes in the load. These swings lead to significant variance in the regulated output voltage ($V_{CCM}$).

During a load transient event, in which the output current ($I_{CCM}$) suddenly increases, the emitter current ($I_{E\_606}$) of the output transistor ($Q_{OUT}$) 606 suddenly increases, causing an increase in the base-to-emitter voltage ($V_{BE\_OUT}$) of the output transistor ($Q_{OUT}$) 606. For example, in an embodiment, when the output current ($I_{CCM}$) suddenly increases from 0 to $I_{CCM\_MAX}$, the change in base-to-emitter voltage ($\Delta V_{BE\_OUT}$) is given by:

$$\Delta V_{BE\_OUT} \approx V_T \times \ln\frac{I_{CCM\_MAX}}{I_{0\_DC}} \tag{4}$$

where $V_T$ is thermal voltage of a PN junction and $I_{CCM\_MAX}$ is the maximal load current. In embodiments, the $I_{CCM\_MAX}$ is between 80 and 150 mA. In embodiments, the current ($I_{o\_DC}$) is between 1 and 5 mA. In embodiments, the current ($I_{o\_DC}$) is greater than 5 mA and less than 1 mA.

To mitigate these fluctuations, the feedback loop circuit 604 sources a current equal to $$\frac{M \times I_{CCM}}{1+M}$$

through the seventh transistor ($Q_7$) 644 while a feedback current ($I_{FB}$) that is equal to $$\frac{I_{CCM}}{1+M}$$

is drawn from the feedback transistor ($Q_{FB}$) 642. As the majority of the current is sourced through the seventh transistor ($Q_7$) 644, which is an NPN BJT, the regulated voltage is less affected by the variation of the base-to-emitter voltage ($\Delta V_{BE\_OUT}$) and the overall performance after the loop reaction time is no longer limited by the output transistor ($Q_{OUT}$) 606, which is a PNP BJT.

Accordingly, the feedback current ($I_{FB}$) pulls up the output voltage ($V_{B\_OUT}$) to compensate for the increase in base-to-emitter voltage ($V_{BE\_OUT}$) of the output transistor ($Q_{OUT}$) 606 to recover from the load transient event and maintain the regulated output voltage ($V_{CCM}$) at a constant value.

The current sourced by the feedback transistor ($Q_{FB}$) 642, arranged as a transdiode, and current at the output transistor ($Q_{OUT}$) 606 remains consistent, thereby reducing the variability of the output current ($I_{CCM}$). This regulation advantageously stabilizes the voltage drop at the regulated output voltage ($V_{CCM}$), ensuring a more constant performance despite shifts in load conditions.

The optional second capacitor ($C_2$) 646 improves the stability of the feedback loop circuit 604. In embodiments, depending on the value of the bypass capacitor ($C_{BYP}$) 612 and different poles and nodes in the linear voltage regulator 600, the second capacitor ($C_2$) 646 may be excluded from the feedback loop circuit 604.

The optional first capacitor ($C_1$) 608 and the optional first current generator 610 stabilize the output voltage ($V_{B\_OUT}$). In embodiments, a load transient event faster than the bandwidth of feedback loop circuit 604 is compensated through the first capacitor ($C_1$) 608 coupled to the base terminal of the output transistor ($Q_{OUT}$) 606. Similar to the bypass capacitor ($C_{BYP}$) 612, the first capacitor ($C_1$) 608 helps to stabilize the output voltage ($V_{B\_OUT}$). The first capacitor ($C_1$) 608 provides a low impedance path towards the power supply when the high-speed output transistor base current is requested. The first current generator 610 allows the regulated voltage to completely switch OFF when the circuit is turned OFF.

In embodiments, bipolar transistors of the linear voltage regulator 600 are replaced with MOSFETs. In embodiments, a subset of the bipolar transistors of the linear voltage regulator 600 are replaced with MOSFETs.

Figure 7:
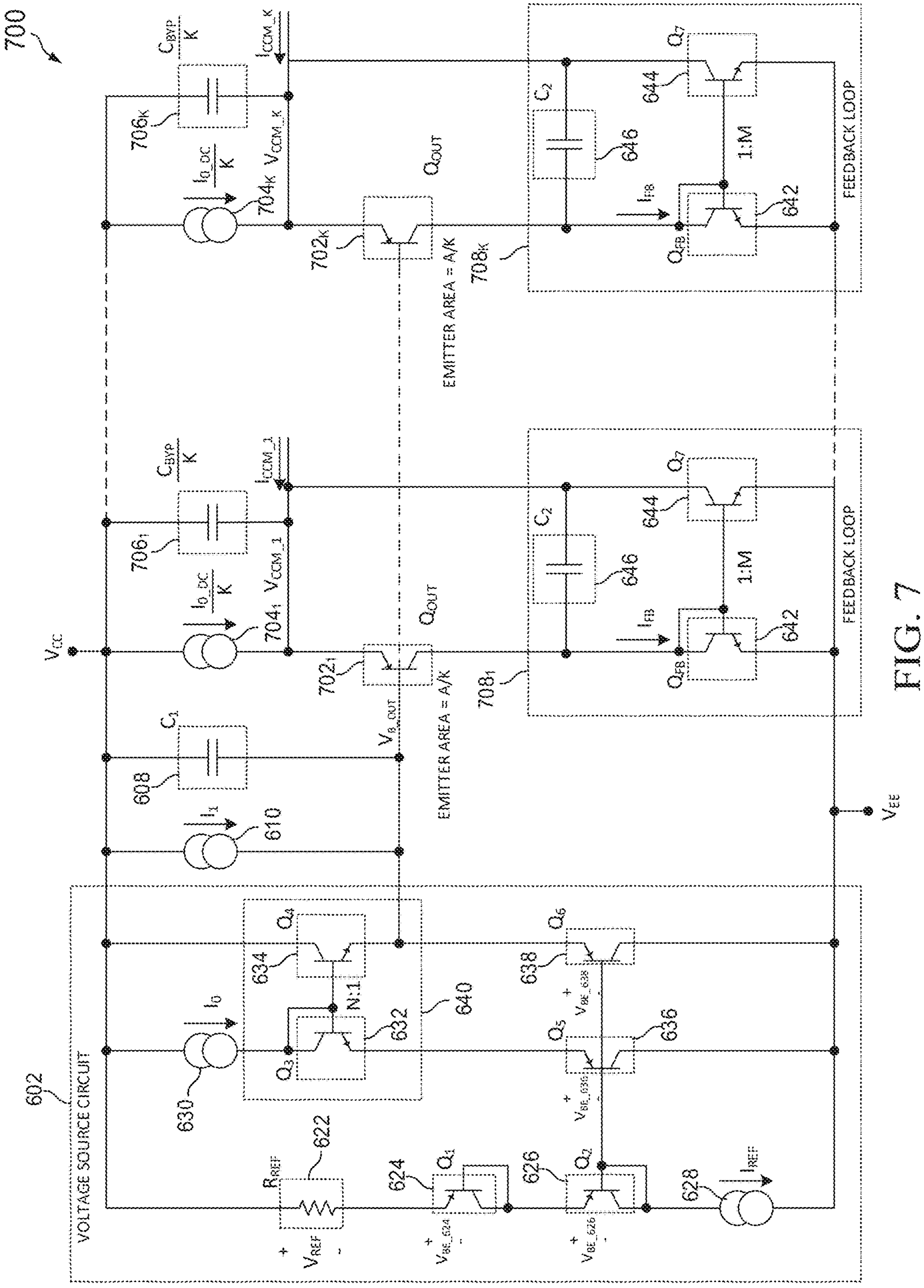
FIG. 7 is a schematic of an embodiment linear voltage regulator.

FIG. 7 illustrates a schematic of an embodiment linear voltage regulator 700, which may be implemented as the high-side linear voltage regulator (CC_REG) 310 of write circuit 300. In contrast to the linear voltage regulator 600, which provides a single regulated output voltage ($V_{CCM}$) for the entire CMOS logic chain, the linear voltage regulator 700 includes a regulated output voltage ($V_{CCM\_i}$) for each stage (i.e., segment/subsection) of the CMOS logic chain, where i is a value from 1 to K, K being equal to the number of consecutive stages of the CMOS logic chain.

Linear voltage regulator 700 includes the voltage source circuit 602, feedback loop circuits $\mathbf{708}_{1\text{-}K}$, output transistors ($Q_{OUT}$) $\mathbf{702}_{1\text{-}K}$, the first capacitor ($C_1$) 608, the first current generator 610, bypass capacitors ($C_{BYP}$/K) $\mathbf{706}_{1\text{-}K}$, and second current generators $\mathbf{704}_{1\text{-}K}$, which may (or may not) be arranged as shown. Linear voltage regulator 700 may include additional components not shown. To ensure conciseness, components with identical reference numbers as those mentioned in the context of FIG. 6 will not be described again since they have the same structure and function as previously detailed.

As discussed with respect to FIG. 5, the jitter observed in a CMOS logic chain is influenced by its delay and transition time. When the transition time of a subsection of the chain surpasses a multiple of the bit-time ($T_{BIT}$), a noticeable step increase in jitter occurs.

The CMOS chain is divided into multiple consecutive stages to enhance the jitter performance, each comprising one or more components designated as a single set. For example, the regulated output voltage for the first set is the first regulated output voltage ($V_{CCM\_1}$), the regulated output voltage for the next set is the second regulated output voltage ($V_{CCM\_2}$), leading up to the final set, which as a regulated output voltage ($V_{CCM\_K}$). By partitioning the CMOS chain into these successive stages, it is possible to reduce the delay for each segment to less than one bit-time (i.e., 1 $T_{BIT}$).

The total number of stages (i.e., the value of the variable K) can be determined by the depth of signal propagation through the CMOS logic chain and the complexity of the CMOS logic chain. For example, for a propagation delay of ins and a target bit-time of 200 ps, the CMOS logic chain can be split into approximately 5 or 6 stages. Each stage would, therefore, have a propagation time that falls below one bit-time (i.e., 1 $T_{BIT}$), ensuring that the correct value of the regulated voltage can be restored before the arrival of the subsequent bit. The splitting of the CMOS logic chain, advantageously, mitigates jitter by keeping each stage's delay within a fraction of one bit-time (i.e., 1 $T_{BIT}$) and allowing for timely signal recovery between bit transitions.

Accordingly, the linear voltage regulator 700 includes an output transistor ($Q_{OUT}$) 702, a second current generator 704, a bypass capacitor ($C_{BYP}$/K) 706, and a feedback loop circuit 708 for each stage of the divided CMOS logic chain.

In embodiments, each output transistor ($Q_{OUT}$) 702 has a transistor area equal to A/K, where A is the transistor area of the output transistor ($Q_{OUT}$) 606 of linear voltage regulator 600 and K is the number of partitions of the CMOS logic chain. The base terminal of each output transistor ($Q_{OUT}$) 702 is coupled to the emitter of the sixth transistor ($Q_6$) 638 with an output voltage ($V_{B\_OUT}$). In some embodiments, the transistor areas for each of the K number of the output transistor ($Q_{OUT}$) 702 can vary based on application.

For example, the regulated output voltage ($V_{CCM\_1}$) is provided through the first output transistor ($Q_{OUT}$) $\mathbf{702}_1$ to the first set of multiple consecutive stages of the CMOS logic chain and the regulated output voltage ($V_{CCM\_K}$) is provided through the final output transistor ($Q_{OUT}$) $\mathbf{702}_K$ to the last set of multiple consecutive stages of the CMOS logic chain.

Each output transistor ($Q_{OUT}$) 702 is coupled to a respective feedback loop circuit 708, second current generator 704, and bypass capacitor ($C_{BYP}$/K) 706.

Each second current generator 704 has the same function as the second current generator 614 in linear voltage regulator 600. However, the current generated by each second current generator 704 equals 1/K the current ($I_{o\_DC}$) generated by the second current generator 614.

Each bypass capacitor ($C_{BYP}$/K) 706 has the same function as the bypass capacitor ($C_{BYP}$) 612 in linear voltage regulator 600. However, the capacitance value of each bypass capacitor ($C_{BYP}$/K) 706 is equal to 1/K the capacitance of the bypass capacitor ($C_{BYP}$) 612.

Each feedback loop circuit 708 operates similarly to the feedback loop circuit 604 described with respect to the linear voltage regulator 600, with the same structure and components.

For example, the first feedback loop circuit $\mathbf{708}_1$ is coupled to the first output transistor ($Q_{OUT}$) $\mathbf{702}_1$ and configured to adjust the regulated output voltage ($V_{CCM\_1}$) during a transient event. The last feedback loop circuit $\mathbf{708}_K$ is coupled to the final output transistor ($Q_{OUT}$) $\mathbf{702}_K$ and configured to adjust the regulated output voltage ($V_{CCM\_K}$) during a transient event.

In embodiments, bipolar transistors of the linear voltage regulator 700 are replaced with MOSFETs. In embodiments, a subset of the bipolar transistors of the linear voltage regulator 700 are replaced with MOSFETs.

Figure 8:
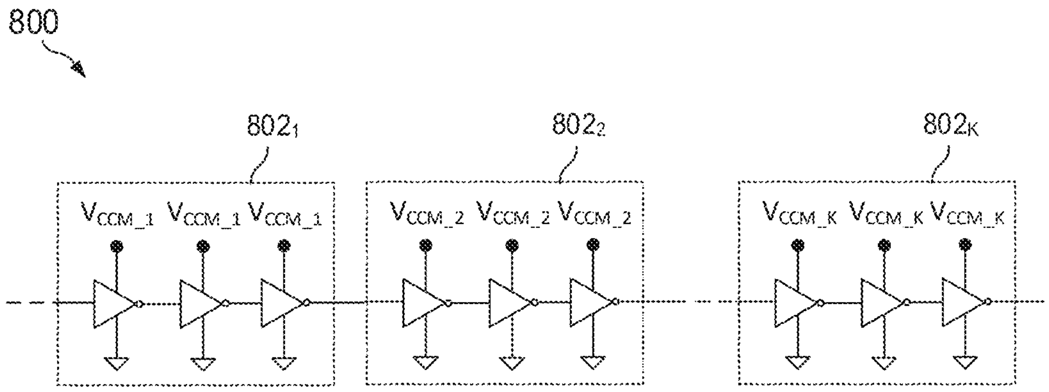
FIG. 8 is a schematic of an inverter chain.

FIG. 8 illustrates a schematic of an inverter chain 800 divided into K number of stages 802$_i$, where i is a value from 1 to K, K being equal to the number of consecutive stages of the inverter chain 800. In embodiments, the inverter chain 800 is a driving stage to drive the output DAC at each branch of the H-bridge, as shown in FIG. 3.

The regulated output voltage ($V_{CCM\_1}$) is provided as a supply voltage to the first stage 8021 of inverter chain 800. The regulated output voltage ($V_{CCM\_2}$) is provided as a supply voltage to the second stage 802$_2$ of inverter chain 800. Finally, the regulated output voltage ($V_{CCM\_K}$) is provided as a supply voltage to the last stage 802$_K$ of inverter chain 800.

Although the logic chain 800 is illustrated using inverters, it should be appreciated that in embodiment, the logic chain may include other logic gates, such as AND gates, OR gates, NAND gates, NOR gates, XOR gates, buffers, or a combination thereof, connected in a chain.

The arrangement of the inverter chain 800 into K number of stages 802$_i$, results in each segment of the logic chain, when introducing a perturbation, not influencing the power supply of other segments within the chain. Additionally, the propagation delay for each stage can be precisely adjusted according to the data rate required by the specific application. Such tuning aims to enhance the overall performance by minimizing the output jitter.

In embodiments, each stage's power consumption and device size distribution may vary depending on the driven segment under consideration.

Figure 9:
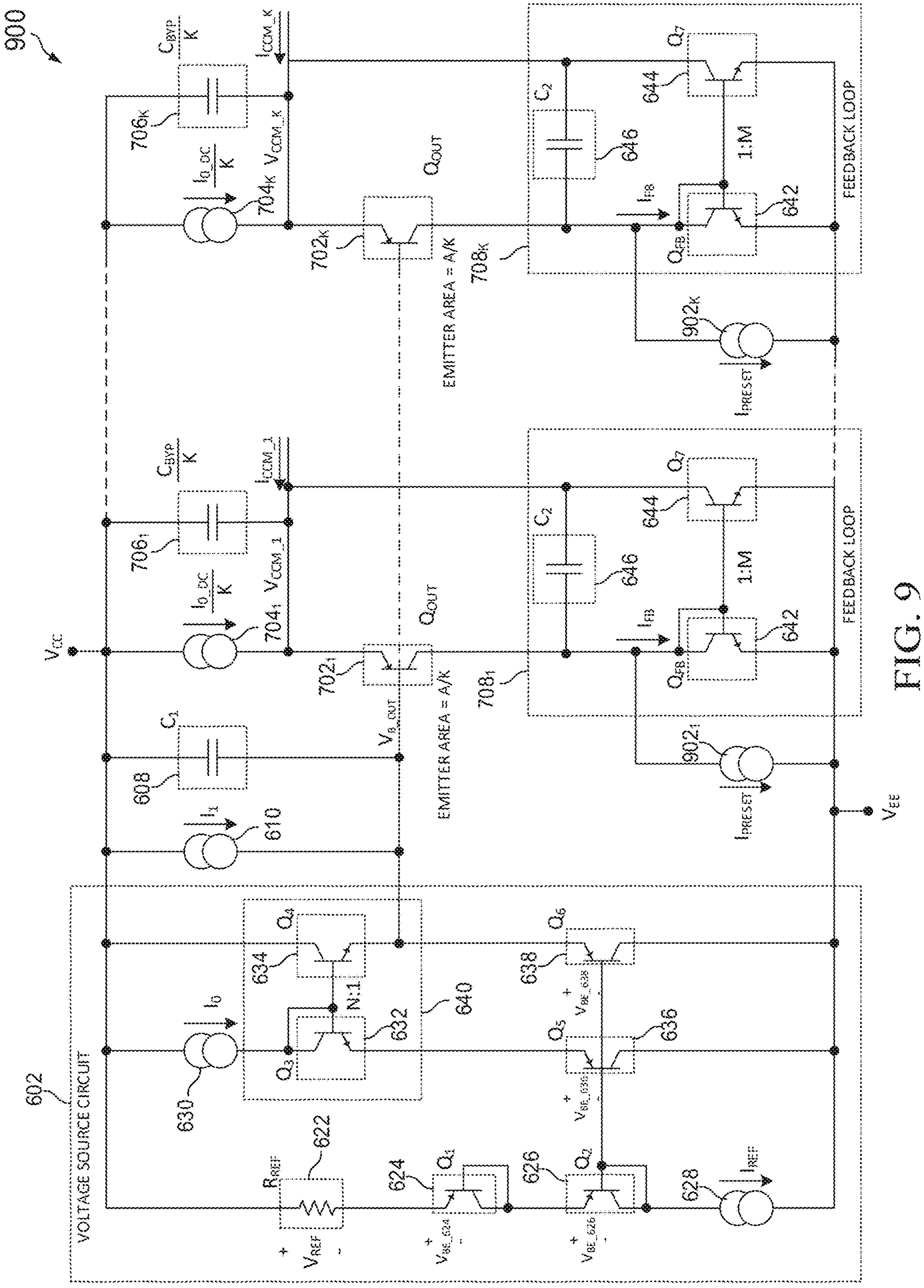
FIG. 9 is a schematic of an embodiment linear voltage regulator.

FIG. 9 illustrates a schematic of an embodiment linear voltage regulator 900, which may be implemented as the high-side linear voltage regulator (CC_REG) 310 of write circuit 300. In addition to the components discussed with respect to the linear voltage regulator 700, linear voltage regulator 900 includes K number of preset current generators 902—one for each stage of the CMOS logic chain. To ensure conciseness, components with identical reference numbers as those mentioned in the context of FIG. 7 will not be described again since they have the same structure and function as previously detailed.

Each preset current generator 902 is coupled in parallel to the collector/base terminals of the feedback transistor ($Q_{FB}$) 642 of each feedback loop circuit 708. The preset current generator 902 is configured to force a preset current ($I_{PRESET}$) through the respective output transistor ($Q_{OUT}$) 702 during a steady state condition. The current flowing in the feedback transistor ($Q_{FB}$) 642, arranged in the transdiode configuration, equals the current $$\left(\frac{I_{0\_DC}}{K}\right)$$

generated by each second current generator 704 minus the preset current ($I_{PRESET}$) and can be in the order of 100 uA.

During a sudden increase in load current, the excess current flowing in the feedback loop circuit 708 operates as discussed with respect FIGS. 6 and 7. For example, during a load transient event, in which the output current ($I_{CCM}$) suddenly increases, the emitter current ($I_{E\_702}$) of the output transistor ($Q_{OUT}$) 702 suddenly increases, causing an increase in the base-to-emitter voltage ($V_{BE\_OUT}$) of the output transistor ($Q_{OUT}$) 702. For example, in an embodiment, when the output current ($I_{CCM}$) suddenly increases from 0 to $I_{CCM\_MAX}$, the change in base-to-emitter voltage ($\Delta V_{BE\_OUT}$) is given by:

$$\Delta V_{BE\_OUT} \approx V_T \times \ln\frac{I_{CCM\_MAX}}{I_{PRESET}} \tag{5}$$

Accordingly, the preset current generator 902 forces the DC current to mainly flow through the output transistor ($Q_{OUT}$) 702, further reducing the output excursion (i.e., $\Delta V_{BE\_OUT}$).

In embodiments, bipolar transistors of the linear voltage regulator 900 are replaced with MOSFETs. In embodiments, a subset of the bipolar transistors of the linear voltage regulator 900 are replaced with MOSFETs.

Figure 10:
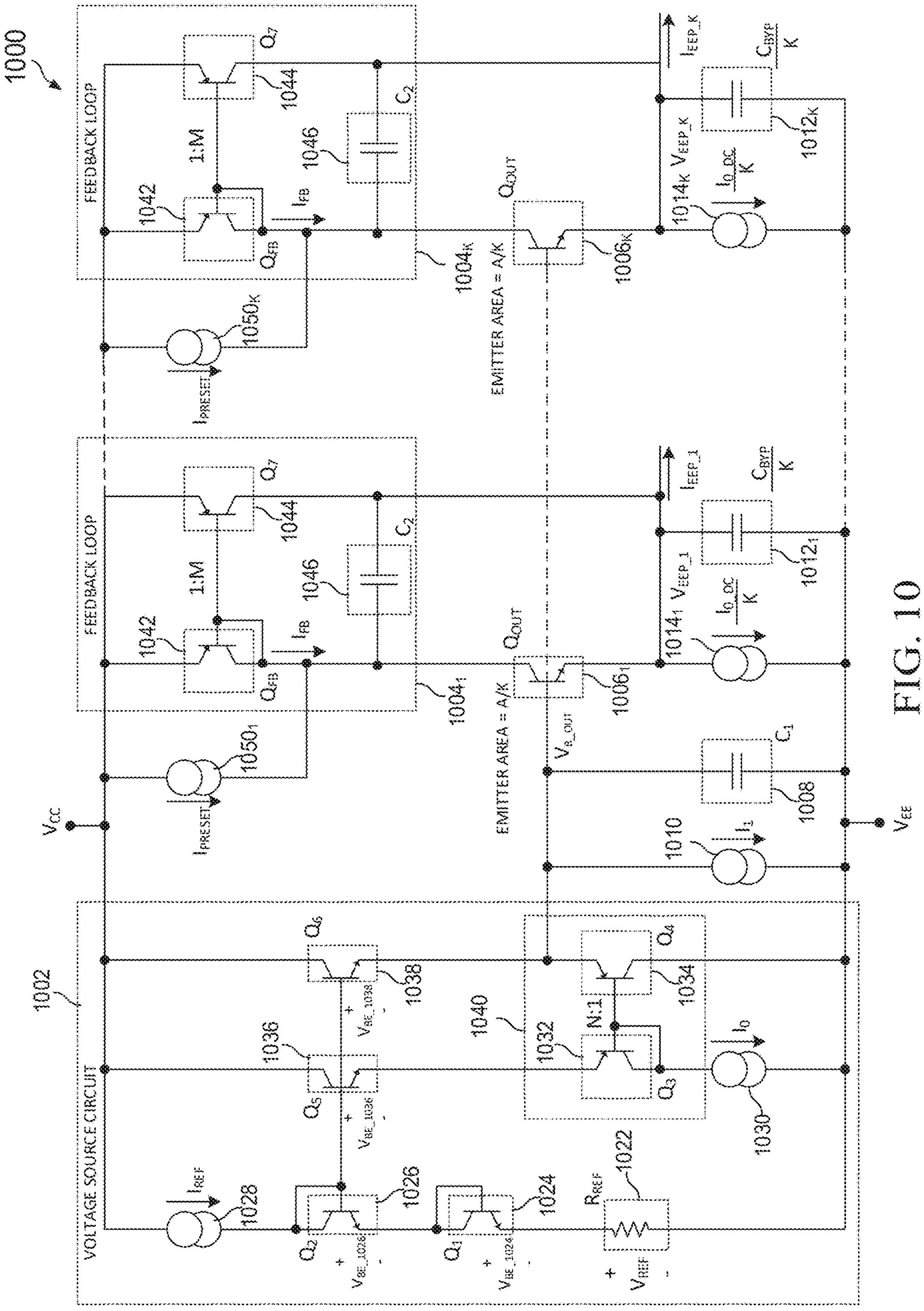
FIG. 10 is a schematic of an embodiment linear voltage regulator.

FIG. 10 illustrates a schematic of an embodiment linear voltage regulator 1000, which may be implemented as the low-side linear voltage regulator (EE_REG) 312 of write circuit 300 and configured to generate the regulated output voltage ($V_{EEP}$).

Linear voltage regulators 600, 700, and 800 may be modified to supply a regulated output voltage ($V_{EEP}$), which is a more positive voltage than the supply voltage ($V_{EE}$).

Linear voltage regulator 1000, for example, operates in a similar manner as linear voltage regulator 800. However, linear voltage regulator 1000 provides a regulated output voltage ($V_{EEP}$), which is a more positive voltage than the supply voltage ($V_{EE}$).

Figure 11:
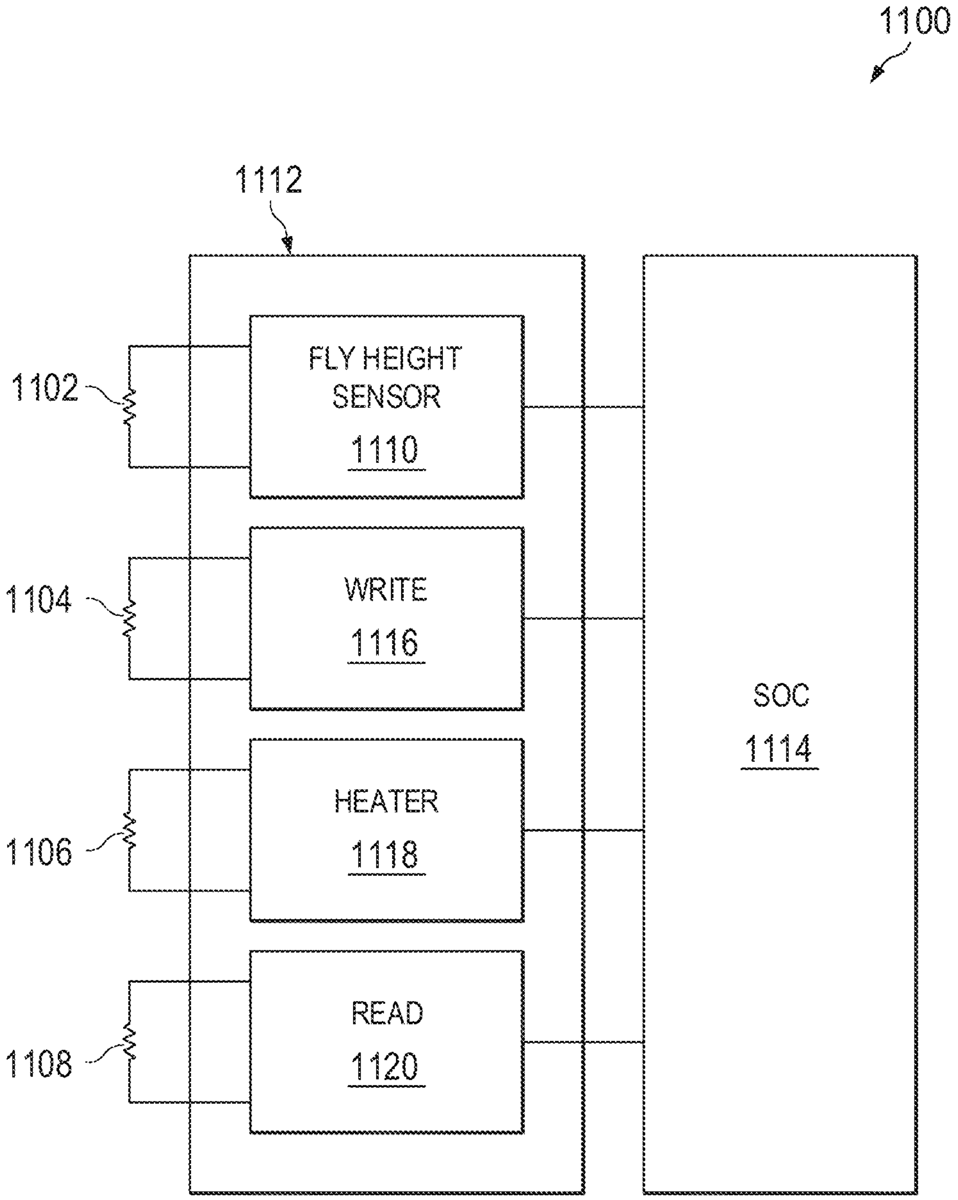
FIG. 11 is a block diagram of a pre-amplifier that is placed on the disk drive head stack assembly of a hard disk drive.

FIG. 11 illustrates a block diagram of a pre-amplifier 1112 that is placed on the disk drive head stack assembly of a hard disk drive. In embodiments, the write circuit 300 is implemented as the write circuit 1116 of the pre-amplifier 1112.

The disk drive head stack assembly slides over the disk. The pre-amplifier 1112 includes a fly height sensor 1110. In embodiments, the fly height sensor 1110 includes a biasing circuit and an amplifier (not shown). The fly height sensor 1110 is coupled to a resistive sensor 1102. The resistive sensor 1102 monitors the fly height between the disk drive head and the disk itself.

A write resistor 1104 is coupled to the write circuit 1116 (for writing to the disk), a heater resistor 1106 is coupled to the heater circuit 1118 (for controlling the fly height spacing), and a read resistor 1108 is coupled to the read circuit 1120 (for reading from the disk). The fly height sensor 1110, write circuit 1116, heater circuit 1118, and read circuit 1120 are coupled to a silicon-on-chip (SoC) 1114 for processing.

A first aspect relates to a linear voltage regulator, comprising a voltage source circuit configured to provide a first voltage at an output terminal of the voltage source circuit; an output transistor having a control terminal coupled to the output terminal of the voltage source circuit and configured to receive the first voltage, a first current path terminal of the output transistor couplable to a load and configured to provide a regulated output voltage to the load based on the first voltage; and a feedback loop circuit comprising: sense circuitry configured to sense current sourced by the output transistor, the circuitry coupled to a second current path terminal of the output transistor, and a second transistor configured as a current mirror with the sense circuitry, the second transistor coupled to the load, wherein the current mirror has a ratio of 1:M, where M is a number normally greater than or equal to 1.

In a first implementation form of the linear voltage regulator, according to the first aspect as such, the feedback loop circuit further comprises a capacitor coupled between the second current path terminal of the output transistor and the load.

In a second implementation form of the linear voltage regulator, according to the first aspect as such or any preceding implementation form of the first aspect, the linear voltage regulator further includes a bypass capacitor coupled between a supply voltage and the load; and a current generator coupled between the supply voltage and the load.

In a third implementation form of the linear voltage regulator, according to the first aspect as such or any preceding implementation form of the first aspect, the feedback loop circuit further comprises a current generator coupled in parallel to the feedback transistor.

In a fourth implementation form of the linear voltage regulator, according to the first aspect as such or any preceding implementation form of the first aspect, the output transistor is a PNP-type bipolar junction transistor (BJT) or a p-channel metal-oxide-semiconductor field effect transistor (MOSFET).

In a fifth implementation form of the linear voltage regulator, according to the first aspect as such or any preceding implementation form of the first aspect, the feedback transistor and the second transistor are NPN bipolar junction transistors (BJTs) or n-channel metal-oxide-semiconductor field effect transistors (MOSFETs).

In a sixth implementation form of the linear voltage regulator, according to the first aspect as such or any preceding implementation form of the first aspect, the voltage source circuit comprises a reference current generator and a reference resistor, wherein, during steady state, a reference current generated by the reference current generator flows through the reference current generator to generate a reference voltage, and wherein the regulated output voltage equals a voltage across the reference resistor during the steady state.

A second aspect relates to a linear voltage regulator, comprising: a voltage source circuit configured to provide a first voltage at an output terminal of the voltage source circuit; a plurality of output transistors, each output transistor having a control terminal coupled to the output terminal of the voltage source circuit and configured to receive the first voltage, a first current path terminal of each output transistor configured to provide a respective regulated output voltage based on the first voltage to a respective stage of a complimentary metal-oxide-semiconductor (CMOS) logic chain, wherein the CMOS logic chain comprises a plurality of consecutive CMOS logic stages; and a plurality of feedback loop circuits, each feedback loop circuit comprising: a feedback transistor configured in a transdiode configuration and coupled to a second current path terminal of an associated output transistor, and a second transistor configured as a current mirror with the feedback transistor, the second transistor couplable to the respective stage of the CMOS logic chain coupled with the associated output transistor, wherein the current mirror has a ratio of 1:M, where M is an integer greater than or equal to 1.

In a first implementation form of the linear voltage regulator, according to the second aspect as such, the CMOS logic chain drives an output digital-to-analog converter (DAC) in a write circuit for a hard disk drive pre-amplifier.

In a second implementation form of the linear voltage regulator, according to the second aspect as such or any preceding implementation form of the second aspect, a count of output transistors in the linear voltage regulator equals a total number of stages of the CMOS logic chain.

In a third implementation form of the linear voltage regulator, according to the second aspect as such or any preceding implementation form of the second aspect, a total number of stages of the CMOS logic chain is set based on a propagation delay of the CMOS logic chain and a target bit-time.

In a fourth implementation form of the linear voltage regulator, according to the second aspect as such or any preceding implementation form of the second aspect, each feedback loop circuit further comprises a capacitor coupled between the second current path terminal of the associated output transistor and the respective stage of the CMOS logic chain.

In a fifth implementation form of the linear voltage regulator, according to the second aspect as such or any preceding implementation form of the second aspect, each output transistor is a PNP-type bipolar junction transistor (BJT) or a p-channel metal-oxide-semiconductor field effect transistor (MOSFET).

In a sixth implementation form of the linear voltage regulator, according to the second aspect as such or any preceding implementation form of the second aspect, each feedback transistor and each second transistor are NPN bipolar junction transistors (BJTs) or n-channel metal-oxide-semiconductor field effect transistors (MOSFETs).

A third aspect relates to a write circuit for writing data to a hard disk drive, the write circuit comprising: an output digital-to-analog converter (DAC); a complimentary metal-oxide-semiconductor (CMOS) logic chain configured to drive the DAC, the CMOS logic chain comprising a plurality of consecutive CMOS logic sets; a linear voltage regulator, comprising: a voltage source circuit configured to provide a first voltage at an output terminal of the voltage source circuit; a plurality of output transistors, each output transistor having a control terminal coupled to the output terminal of the voltage source circuit and configured to receive the first voltage, a first current path terminal of each output transistor configured to provide a respective regulated output voltage based on the first voltage to a respective stage of the plurality of consecutive CMOS logic sets; and a plurality of feedback loop circuits, each feedback loop circuit comprising: a feedback transistor configured in a transdiode configuration and coupled to a second current path terminal of an associated output transistor, and a second transistor configured as a current mirror with the feedback transistor, the second transistor couplable to the respective stage of the CMOS logic chain coupled with the associated output transistor.

In a first implementation form of the write circuit, according to the third aspect as such, a count of output transistors in the linear voltage regulator equals a total number of stages of the plurality of consecutive CMOS logic sets.

In a second implementation form of the write circuit, according to the third aspect as such or any preceding implementation form of the third aspect, a total number of stages of the plurality of consecutive CMOS logic sets is set based on a propagation delay of the CMOS logic chain and a target bit-time.

In a third implementation form of the write circuit, according to the third aspect as such or any preceding implementation form of the third aspect, each output transistor is a PNP-type bipolar junction transistor (BJT) or a p-channel metal-oxide-semiconductor field effect transistor (MOSFET).

In a fourth implementation form of the write circuit, according to the third aspect as such or any preceding implementation form of the third aspect, each feedback transistor and each second transistor are NPN bipolar junction transistors (BJTs) or p-channel metal-oxide-semiconductor field effect transistors (MOSFETs).

In a fifth implementation form of the write circuit, according to the third aspect as such or any preceding implementation form of the third aspect, the linear voltage regulator further comprises a plurality of bypass capacitors coupled between a supply voltage and the respective stage of the CMOS logic chain; and a current generator coupled between the supply voltage and the respective stage of the CMOS logic chain.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A linear voltage regulator, comprising:

a voltage source circuit configured to provide a first voltage at an output terminal of the voltage source circuit;

an output transistor having a control terminal coupled to the output terminal of the voltage source circuit and configured to receive the first voltage, a first current path terminal of the output transistor couplable to a load and configured to provide a regulated output voltage to the load based on the first voltage; and feedback loop circuit comprising:

a sense circuitry comprising a feedback transistor configured to sense current sourced by the output transistor, the sense circuitry coupled to a second current path terminal of the output transistor, and a second transistor configured as a current mirror with the feedback transistor, the second transistor coupled to the load, wherein the current mirror has a ratio of 1:M, where M is a number normally greater than or equal to 1.

2. The linear voltage regulator of claim 1, wherein the feedback loop circuit further comprises a capacitor coupled between the second current path terminal of the output transistor and the load.

3. The linear voltage regulator of claim 1, further comprising:

a bypass capacitor coupled between a supply voltage and the load; and a current generator coupled between the supply voltage and the load.

4. The linear voltage regulator of claim 1, wherein the feedback loop circuit further comprises a current generator coupled in parallel to the feedback transistor.

5. The linear voltage regulator of claim 1, wherein the output transistor is a PNP-type bipolar junction transistor (BJT) or a p-channel metal-oxide-semiconductor field effect transistor (MOSFET).

6. The linear voltage regulator of claim 1, wherein the feedback transistor and the second transistor are NPN bipolar junction transistors (BJTs) or n-channel metal-oxide-semiconductor field effect transistors (MOSFETs).

7. The linear voltage regulator of claim 1, wherein the voltage source circuit comprises a reference current generator and a reference resistor, wherein, during steady state, a reference current generated by the reference current generator flows through the reference resistor to generate a reference voltage, and wherein the regulated output voltage equals a voltage across the reference resistor during the steady state.

8. A linear voltage regulator, comprising:

a voltage source circuit configured to provide a first voltage at an output terminal of the voltage source circuit;

a plurality of output transistors, each output transistor having a control terminal coupled to the output terminal of the voltage source circuit and configured to receive the first voltage, a first current path terminal of each output transistor configured to provide a respective regulated output voltage based on the first voltage to a respective stage of a complementary metal-oxide-semiconductor (CMOS) logic chain, wherein the CMOS logic chain comprises a plurality of consecutive CMOS logic stages; and a plurality of feedback loop circuits, each feedback loop circuit comprising:

a feedback transistor configured in a transdiode configuration and coupled to a second current path terminal of an associated output transistor, and a second transistor configured as a current mirror with the feedback transistor, the second transistor couplable to the respective stage of the CMOS logic chain coupled with the associated output transistor, wherein the current mirror has a ratio of 1:M, where M is an integer greater than or equal to 1.

9. The linear voltage regulator of claim 8, wherein the CMOS logic chain drives an output digital-to-analog converter (DAC) in a write circuit for a hard disk drive pre-amplifier.

10. The linear voltage regulator of claim 8, wherein a count of output transistors in the linear voltage regulator equals a total number of stages of the CMOS logic chain.

11. The linear voltage regulator of claim 8, wherein a total number of stages of the CMOS logic chain is set based on a propagation delay of the CMOS logic chain and a target bit-time.

12. The linear voltage regulator of claim 8, wherein each feedback loop circuit further comprises a capacitor coupled between the second current path terminal of the associated output transistor and the respective stage of the CMOS logic chain.

13. The linear voltage regulator of claim 8, wherein each output transistor is a PNP-type bipolar junction transistor (BJT) or a p-channel metal-oxide-semiconductor field effect transistor (MOSFET).

14. The linear voltage regulator of claim 8, wherein each feedback transistor and each second transistor are NPN bipolar junction transistors (BJTs) or n-channel metal-oxide-semiconductor field effect transistors (MOSFETs).

15. A method for operating a linear voltage regulator, the method comprising:

providing, by a voltage source circuit, a first voltage at an output terminal of the voltage source circuit;

receiving, by an output transistor, the first voltage, the output transistor having a control terminal coupled to the output terminal of the voltage source circuit;

providing, by a first current path terminal of the output transistor, a regulated output voltage to a load based on the first voltage, the output transistor being couplable to the load; and sensing, by a feedback transistor of a sense circuitry, current sourced by the output transistor, the sense circuitry being part of a feedback loop circuit, the sense circuitry coupled to a second current path terminal of the output transistor, wherein the feedback transistor and a second transistor are arranged as a current mirror, the second transistor coupled to the load, the current mirror having a ratio of 1:M, and M being a number normally greater than or equal to 1.

16. The method of claim 15, wherein the feedback loop circuit further comprises a capacitor coupled between the second current path terminal of the output transistor and the load.

17. The method of claim 15, wherein the feedback loop circuit further comprises a current generator coupled in parallel to the feedback transistor.

18. The method of claim 15, wherein the output transistor is a PNP-type bipolar junction transistor (BJT) or a p-channel metal-oxide-semiconductor field effect transistor (MOSFET).

19. The method of claim 15, wherein the feedback transistor and the second transistor are NPN bipolar junction transistors (BJTs) or n-channel metal-oxide-semiconductor field effect transistors (MOSFETs).

20. The method of claim 15, wherein the voltage source circuit comprises a reference current generator and a reference resistor, wherein, during steady state, a reference current generated by the reference current generator flows through the reference resistor to generate a reference voltage, and wherein the regulated output voltage equals a voltage across the reference resistor during the steady state.

* * * * *